INVENTOR.
THOMAS PROCTOR

INVENTOR.
THOMAS PROCTOR

United States Patent Office 3,555,516
Patented Jan. 12, 1971

3,555,516
SUPERVISORY SYSTEM FOR TIME-SHARED
NUMERICAL CONTROL SYSTEM
Thomas Proctor, Lyndhurst, Ohio, assignor, by mesne assignments, to Allen-Bradley Company, Milwaukee, Wis., a corporation of Wisconsin
Continuation-in-part of application Ser. No. 709,466, Feb. 29, 1968. This application Aug. 26, 1968, Ser. No. 755,470
Int. Cl. G06f *15/46*
U.S. Cl. 340—172.5          6 Claims

ABSTRACT OF THE DISCLOSURE

In a numerical control system of the type wherein a central processor provides control instructions on a time-shared basis to a plurality of remotely located numerically controlled machine tools, provision is made for gathering data at the central processor from the various machine tool locations for the purpose of preventive maintenance.

BACKGROUND OF THE INVENTION

This application is a continuation-in-part of patent application Ser. No. 709,466, filed Feb. 29, 1968, now abandoned, for "Supervisory System for Time-Shared Numerical Control System," by this inventor.

This invention relates to numerical control systems and more particularly to improvements in numerical control systems which are operated in a time-shared manner from a central processor.

There are at least two types of operations of numerically controlled machine tools at present for which central processing control on a time-shared basis can be advantageously employed. One of these is the machine shop operation wherein a number of the shops are scattered over an area within a city, each one duplicating the director or tape handling apparatus and associated controls for controlling a numerical machine tool. Another of these is the system employed in large plants where at different machine shop locations throughout the plant these numerically controlled machine tools have associated therewith a director. Advantage may be taken of the high speed data processing capabilities of present day computer techniques for eliminating the necessity for a director at each machine tool location by instead time-sharing a central processor among a plurality of machine tools.

In an application for patent, Ser. No. 590,142, by Norman La Duke and Thomas Proctor, which was filed on Oct. 26, 1966, and which is entitled "Time Shared Automatic Machine Tool Control System," now Pat. No. 3,465,298, there is described a system wherein a central computer or processor can service a number of numerically controlled machine tools which are located either within a single plant, or scattered over a geographical area. Since the central processor has the capacity for storing a great deal of data, advantage of this is taken by having the central processor store the data which can be fed in predetermined control increments to each one of the numerically controlled machine tools, as they require it.

Proper maintenance of a machine tool requires not only that lubrication be applied wherever required, but also, in order to prevent problems arising with both the spindle and the work piece which is being machined, the cutting tool should be replaced before it has worn to a point where the cutting operation is poor and/or as a result stresses are passed back to the spindle which can affect its concentricity, for example. Heretofore, reliance was had upon the visual observation of the machine tool operator for replacing a tool when its useful life has ended. It will be appreciated that the reliance upon the observations of different individuals for knowing when to discard a cutting tool at the end of its useful life may result in the more timid throwing the cutting tool away much before the time for discarding it has arrived and the less timid or lazy or careless may delay the time for throwing a tool away until it is overdue.

OBJECTS AND SUMMARY OF THE INVENTION

An object of this invention is the provision of a time-shared numerical control system which can gather maintenance data which can be used for preventive maintenance.

Yet another object of this invention is the provision of a time-shared numerical control system wherein data is gathered from each machine tool location, which is controlled, at the central processor, and is made available for use for management.

The foregoing and other objects of the invention are achieved by generating signals at the machine tool location which are transmitted to the central processor. These signals are recognized and are used to initiate logical operations to update previously acquired information. The resulting information is compared with stored supervisory information to determine whether preventive maintenance action should be undertaken. If such is the case, then an indicator is actuated.

BRIEF DESCRIPTION OF THE DRAWINGS

FI.G 2 is a block schematic diagram of a supervisory control system in accordance with this invention.

DESCRIPTION OF THE PREFERRED EMBODIMENTS

Figure 1:
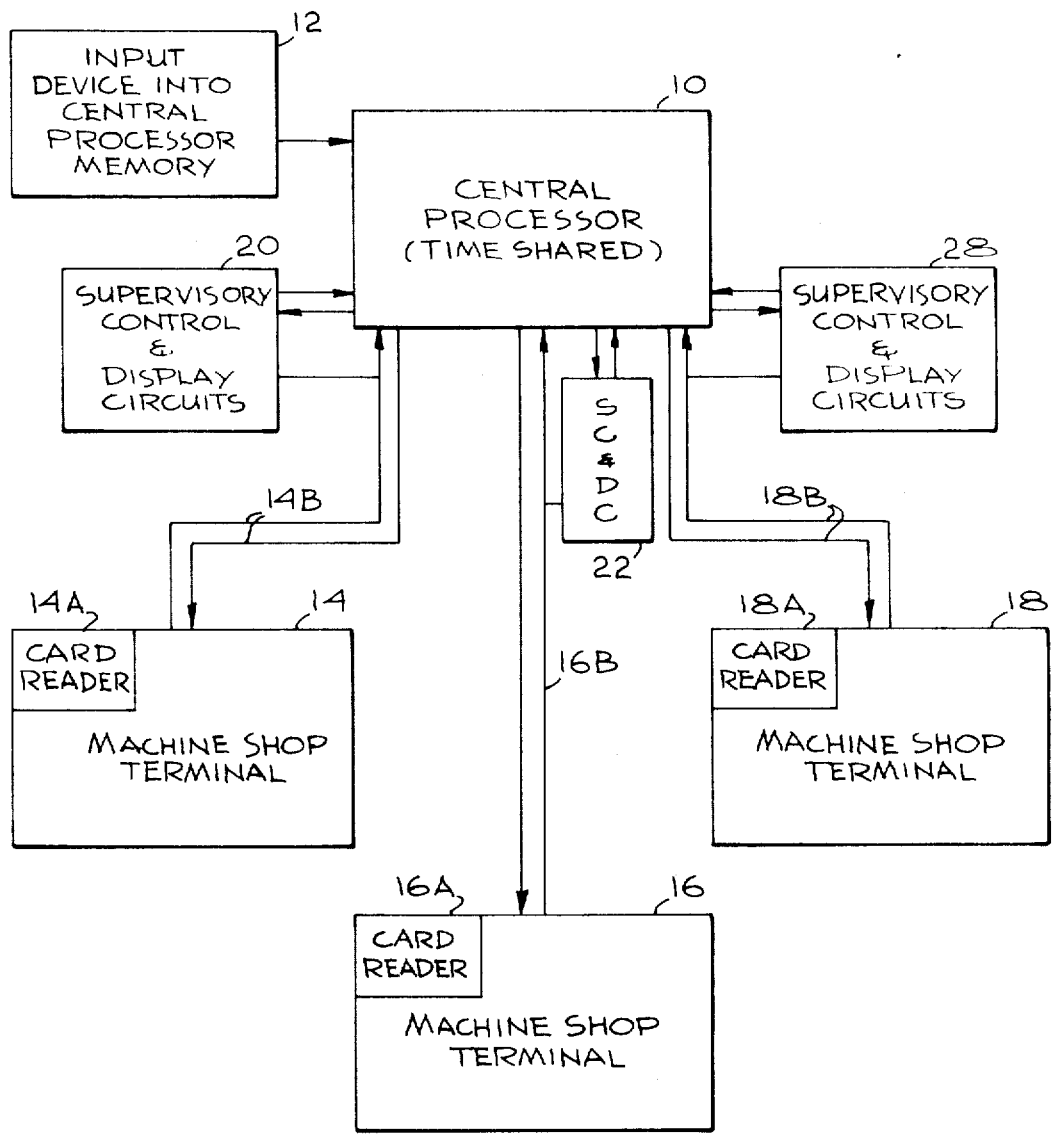
FIG. 1 is a block diagram of a central processor system for controlling remotely located machine tools.

FIG. 1 is a block schematic diagram of a time-shared automatic machine tool control system, which is identical to the one found in application Ser. No. 590,142, filed Oct. 26, 1966 by La Duke and Proctor, now Pat. No. 3,465,298, except for the showing of supervisor display and control circuits. It is being described here for the purpose of making the description of the improvement therein which follows more clear. The central processor 10 effectively has a computer memory system with the usual data read-in and read-out capability. The computer memory has stored therein a plurality of machine tool programs. The format for each program, which is stored, is preferably digital, being, for example, either the EIA standard format (BCD) or a fixed sequential binary format. Each program is broken down into program segments, each of which actually consists of digital words representing instructions to the machine tool X and Y and Z axes, i.e., command words and sign words to indicate the distance and direction of motion of the machine tool along these three axes, and a feedrate word indicative of the rate at which motion is to occur. Each program segment represents motion required for a traverse along a line without changing direction, or along a curve. The last program segment will include an "end of program" code word.

Each program occupies a predetermined region of the memory of the central processor, with the program segments being stored sequentially. Parts which are to be made may be identified by a part number and an associated address indicative of the location in memory where instructions for machining the part are to be found. Each one of the machine shop terminals, respectively 14, 16, 18, has a list of these part numbers and their addresses and has a list of addresses within the central processing memory for the beginning of the program, or the first program segment for each one of all of the programs which are stored in this memory. Each machine shop terminal may address the memory of the central processor with a part number and the address of a program which is desired. If the program address is stored on punched cards, the selected program address card is inserted in a punched card reader, respectively 14A, 16A, 18A, and the address is read over the respective communicating lines 14B, 16B, 18B which couple each of the respective machine shop terminals to the central processor. Also a keyboard may be used for transmitting part number and address information.

The central processor has provision for storing these addresses and for sequentially addressing the memory and sequentially reading out the beginning of the stored program. The central processor divides the motion command words into shorter interval command words which command motion during a predetermined interval determined, for example, as 15 milliseconds. These shorter interval command words together with the instruction information and the signs are sent back to the machine shop terminals, where they are executed. The machine shop terminal then sends back a request for further data and this is processed. The stored address at the central processor is updated as required so that the successive segments of a complete program may be read out as required by the machine tool for executing the program.

An exemplification of the format for the program code which may be stored in the processor memory is described at some length in Pat. No. 3,079,522 of M. N. McGarrell. It is assumed that as previously indicated a plurality of programs are stored in the central processor memory. Each one of the machine shop terminals sends its request for a program, which is the coded address of the program, to the central processor over the respective lines 14B, 16B and 18B.

In accordance with this invention there is provided at the central processor 10 for each machine shop terminal supervisory control and display circuits, respectively 20, 22 and 28. These circuits are connected to receive signals from the respective machine shop terminals. These signals are decoded for the purpose of calling out from memory in the central processor data previously associated with the monitoring operation which is to be performed. Then, the machining operation is monitored for the purpose of updating the data which has been extracted from memory. Meanwhile, a comparison of the totally acquired data with standard data is performed. In the event the monitoring operation indicates a preventive maintenance activity at the machine shop, an indication is given there so that this can be achieved.

In the description of the invention which follows the supervisory control for preventive maintenance will be described in terms of an arrangement for monitoring the life of each cutting tool and providing a warning when it is time for the cutting tool to be changed. It should be understood however that this is by way of illustration and not by way of a limitation upon this invention since other parameters of the machine tool may be monitored for the purpose of supervision as well without departing from the spirit and scope of this invention. For example, bearing wear may be monitored, temperatures at various parts of the machine may be monitored, etc.

Assuming now that it is desired to monitor the life of each tool that is used and to indicate when its useful life is terminated. Where tools are changed manually, there is provided at each machine tool installation, a card reader or other arrangement for generating signals in response to a punched card which is prepared for each tool. This punched card will, when read by the card reader, transmit two binary code words; the first of these two is known as a "$t$" word and it is followed by a word which particularly indentifies the tool with which the card is associated at the machine shop installation, and also constitutes the address of information which has been accumulated in the memory at the central processor indicative of the elapsed tool use as well as the maximum time for which the tool can be used, after which it should be discarded. The "$t$" word and the tool identifying word are in a binary code and each bit of the binary code is accompanied by a clock pulse which is transmitted on a separate line. By way of illustration, a "$t$" word may constitute a four bit word such as 1001. The tool identifying word may be an N bit word, the number of bits being determined by the number of separate words required for indicating the separate tool addresses in memory.

Where a numerically controlled machine tool has provision for automatic tool changing, the instruction to the machine as to which tool to use is recorded on the tape along with the other machine tool instructions and commands. Thus, the tape will have the "$t$" word encoded thereon along with the code, identifying the tool. This code is recorded at the central processor as part of the program for remotely controlling a machine tool. Thus, the "$t$" word and tool identifying word are read out of the processor memory for this arrangement.

One other piece of equipment is required at the machine tool location. This is an instantaneous tool torque transducer 26, (shown in FIG. 2). This includes structure which is mounted on the spindle of the machine tool and which couples through a transformer or slip rings to an amplifier circuit. The AC component of torque caused by the cutting tool striking the work piece during the cutting operation is detected and amplified and is used to generate a DC signal which is also transmitted to the central processor location from the machine tool. These torque transducers are well known devices and are commercially available. For example, one such device is called a "torque meter." It is sold by S. Himmelstein and Company, of 2500 Estes Ave., Elk Grove Village, Ill. It uses foil strain gauges arranged as a wheatstone bridge which are coupled to the shaft of the spindle of the machine and which measures a shaft twist.

Assume now that a machine tool operator at a machine tool location selects a cutting tool for the purpose of performing a particular operation on a work piece. At the time that he selects the cutting tool he also places the punched card in the card reader. In this instance the "$t$" word and tool identifying word are transmitted to the central processor. For the situation where the "$t$" word and tool identifying word are stored in the processor memory, they are read out at the beginning of the program and transmitted to the supervisor display and central circuits which will monitor this particular machine tool.

Figure 2:
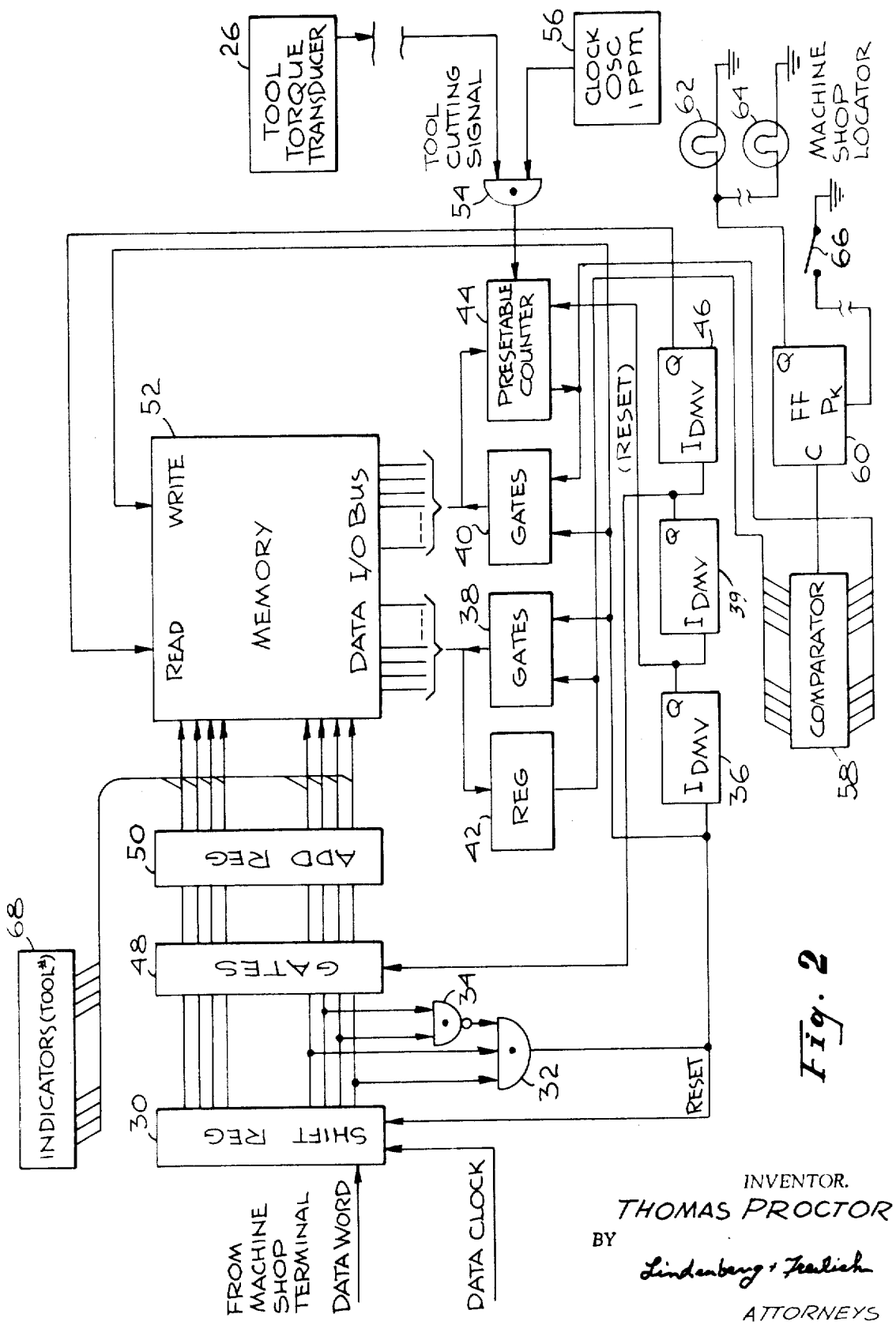

Referring now to FIG. 2, there may be seen a block schematic diagram of a supervisor control and display circuit which is located at the central processor together with the central memory for the processor. The "$t$" word is received by a shift register 30 into which it is clocked by the data clock pulses. An AND gate 32 senses the presence of the two 1's in the "$t$" word stored in the shift register, and a NOR gate 34 senses the presence of the two 0's which are stored in the shift register. The output of the NOR gate constitutes one of the three required inputs to the AND gate. The NOR gate output is present, or is high, only if the two inputs thereto remain as a 0. The output of the AND gate 32 is used to reset the shift register and also to apply a pulse to a first delay multivibrator 36. The output of the AND gate also enables two sets of gates, respectively 38 and 40, to transfer the contents respectively of a register 42 and a presettable counter 44 into memory. The details of the operation of the gates, the register, and the presettable counter will be described subsequently herein.

The output of the first delay multivibrator 36 is used to reset the presettable counter 44. Its output is also applied to a second delay multivibrator 39. The "$t$" word, as previously described, is followed by a word which both identifies the tool being used and also the address in memory for data concerning that tool. This word is entered into the shift register 30 in the same manner as the "t" word was previously entered thereinto. It will be appreciated that the shift register has been cleared in time for the tool word to be entered.

The output of the second delay multivibrator 39 is used both to energize a third delay multivibrator 46 and to enable a plurality of gates 48, whereby the contents of the shift register 30 are entered into the address register 50 for a memory 52.

The memory may be any of the well-known types such as magnetic core or magnetic disc, and accordingly, details of its operation need not be provided here.

The output of the delay multivibrator 46 is a read pulse which is applied to the memory 52 to enable the read-out from the memory of two data words. One of these data words is the expected maximum tool life, and the other data word is a representation of the length of time that the tool has been used up to this time. The tool life word is entered into the register 42 and the accumulated time word is entered into the presettable counter 44. At the machine tool location, the new tool is loaded into the spindle which includes the torque transducer which provides an output signal when the cutting tool actually engages the work piece for the purpose of cutting. The output of the torque transducer is transmitted to the central processor where it is received by an AND gate 54. The other input to the AND gate 54 is the output of a clock oscillator 56 which provides timing pulses, for example, at one pulse per minute.

When the tool actually begins cutting the work piece, the tool transducer output signal is received at the central processor and enables the AND gate 54 to apply clock pulses from the oscillator 56 to the presettable counter. Thus, the counter will increment the pre-existing count which was entered thereinto from the memory, with a value determined by the length of time the tool is actually used for cutting. The output of the presettable counter 44 besides being applied to the gates 40 is also applied to a comparator 58. The other input to the comparator circuit 58 is the data word which is stored in the register 42, which comprises a number representative of the life of the tool. When the number in the presettable counter 44 and that in the register 42 are indicated as identical by the comparator 58, then a flip-flop 60 is actuated by the output of the comparator. The flip-flop is set and its output is used to illuminate a light 62 at the central processor, and also a light 64 at the machine shop location. Flip-flop 60 can only be reset by closing the switch 66, which may be located at the machine shop location, and which is indicative of the fact that the operator has seen the light and has taken the proper corrective action to remove the worn out tool. Otherwise, if desired, in addition to the light 64, the machine tool may be caused to stop, or a loud bell rung, etc.

Should the comparison of the comparator 58 indicate that the tool life number is greater than the use which is occurring, then the data in the register 42 and in the presettable counter 44 has to be restored to the location in the memory indicated by the address still retained in the address register 50. This is done when the "t" word for the next tool to be used arrives. This is applied to the write input line of the memory 52, whereupon the contents of the register 42 and the presettable counter 44 are entered through the gates 38 and 40 which are enabled by the same "t" word pulse.

If desired, an indicator 68 may be connected to the address register to provide a visual indication and/or a record of the tool which is used. This may be coupled with the life data which is found in the memory. Should for some reason the tool not last for the lifetime which is pre-established for it, then the information retained in the memory at the address location for that tool indicates the actual life. This information can be read out and recorded in the well-known manner for the purpose of indicating to management whether the cutting tools are living up to the predicted life expectation. If they are not, then suitable management action can be taken.

There is one restriction on the code used with the circuit shown in FIG. 2, and that is that the code used for the data which is sent following the "t" word must omit the "t" word code format therein; otherwise, the circuit will react in response to the data word like it does to the "t" word and thus not operate properly in response to the data word. This minor restriction can be eliminated by modifying the circuit shown in FIG. 2 in the manner shown in FIG. 3. Only the last four bits of the data code must avoid the "t" word code with this new arrangement.

Figure 3:
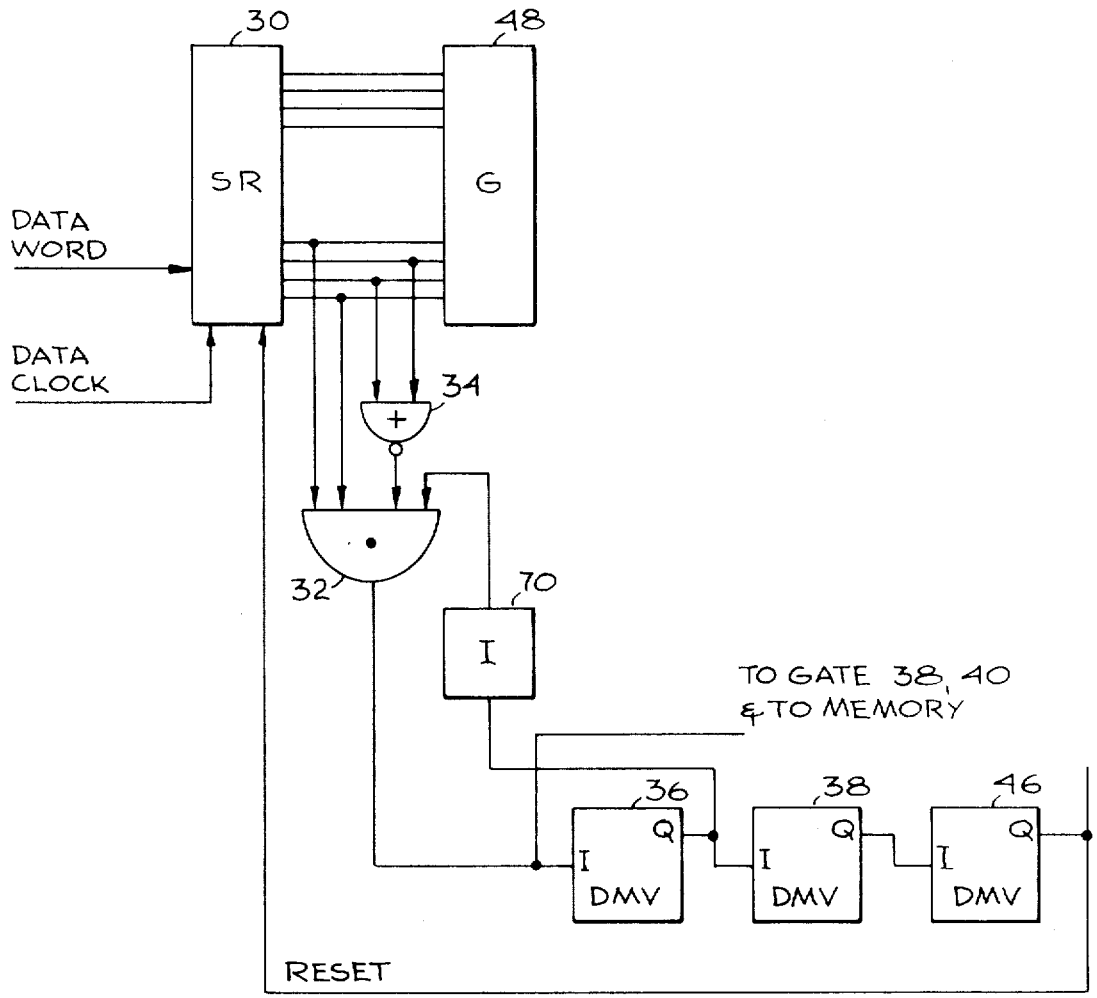
FIG. 3 is a block schematic diagram of a modification of FIG. 2.

FIG. 3 shows the modification of FIG. 2 and only repeats so much of FIG. 2 as to show the location of such modification. AND gate 32 this time is a four-input AND gate. Its output serves the same function as before except that it does not reset the shift register 30. The data which arrives following the "t" word shifts the "t" word out of the register 30. The output from delay multivibrator 36, in addition to its resetting counter 44 and triggering delay multivibrator 38, is applied to an inverter 70. The output of the inverter is used to hold AND gate 32 inoperative while it lasts. This is long enough to insure that all the incoming data is entered into shift register 30 and there will be no response should the "t" word code pattern occur in the data as it is being entered into the shift register. However, the last four bits of the data word must not have the "t" word format (1001).

When delay multivibrator 46 produces an output, it resets the shift register 30. The system is then ready for a new cycle of operation. Thus the modified system operates to block a response to a "t" word code pattern as a data word is entered into the shift register 30.

While the "t" word code has been here designated as 1001, it will be appreciated that this is merely exemplary and is not to be considered as restrictive of the code which may be employed. The "t" word code may be selected as "1111," for example, which has certain advantages when binary coded decimal digits are used, since this permits the use of all "BCD" codes from 0 to 7.

There has accordingly been described and shown herein a novel, useful system for monitoring in a central processor controlled numerical control system the operation at any one of the remotely located numerically controlled machine tools for the purpose of informing that a machine tool part being used will not be good for much longer, and a warning is provided to indicate that corrective action should be taken. In addition, other monitoring functions are carried out for the purpose of providing data as to the wear performance of the machine tool parts whereby management data is made available, as well as affording supervisory control of the remotely located numerically controlled machine tools.

The embodiments of the invention in which an exclusive property or privilege is claimed are defined as follows:

1. In a system of the type wherein a plurality of remotely located numerically controlled machine tools are controlled by a central processor the improvement comprising means for generating first signals identifying a machine tool part which is to be used at a machine tool location, means at each of said machine tool locations for generating second signals whenever said machine tool part is actually being used, means for transmitting said first and second signals to said central processor, means at said central processor for receiving said first and second signals, means at said central processor responsive to said first signals for producing third signals representative of the wear condition of said machine tool part as a result of previous use, means at said central processor for altering said third signals responsive to said second signals to represent the change in wear condition of said machine tool part caused by the use represented by the presence of said second signals, and means at said central processor for detecting when said wear condition of said machine tool part represented by said altered third signals equals a wear condition indicative of the requirement for a maintenance operation and producing a warning thereof.

2. In a system of the type wherein a plurality of remotely located numerically controlled machine tools are controlled by a central processor the improvement comprising:

means for generating first signals identifying a machine tool part which is to be used at a machine tool location, means at each of said machine tool locations for generating second signals whenever said machine tool part is actually being used, means for transmitting said first and second signals to said central processor, means at said central processor for receiving said first and second signals, memory means responsive to said first signals to provide third signals indicative of a desired final wear condition of said machine tool part and fourth signals representative of the wear condition which said machine tool part has already attained, means for altering the condition representation of said fourth signals to provide updated fourth signals responsive to the presence of said second signals, means for comparing said updated fourth signals with said third signals and for producing an output signal when they are equal, and means for providing a warning indication responsive to said output signal.

3. In a system as recited in claim 2 wherein said machine tool part is a cutting tool, said end condition indicated by said third signals is the useful lifetime of said cutting tool, said condition which said machine tool part has attained represented by said fourth signals is the total use to date of said cutting tool, said means for altering the condition representation of said fourth signals includes a counter, means for setting said counter to a count representation indicated by said fourth signals, means for generating clock pulses, and gate means responsive to said second signals for applying said clock pulses to said counter to increase the count of said counter responsive thereto.

4. In a system as recited in claim 2 wherein there is included means for restoring said third signals and said updated fourth signals in said memory means when said machine tool part is no longer used.

5. A system including a plurality of numerically controlled machine tools central processor means for controlling the operation of said machine tools, said central processor means being remotely located from said machine tool locations, means for generating first signals identifying a machine tool part at a machine tool location which wears out with use, means at each of said machine tool locations for generating second signals whenever said machine tool part is actually being used, means for transmitting the first and second signals from each machine tool location to said central processor, means at said central processor for receiving said first and second signals, memory means at said central processor responsive to said first signals to provide third signals indicative of the desired useful lifetime of said machine tool part and fourth signals indicative of the period over which said machine tool part has already been used, means for increasing the value of said fourth signals to provide updated fourth signals responsive to the presence of said second signals, means for comparing said updated fourth signals with said third signals and for producing an output signal when they are equal, means for providing a warning indication at said central processor and at a machine tool location responsive to said output signal, and means for storing said third signals and said updated fourth signals in said memory means when said machine tool part is no longer used.

6. In a system of the type wherein a plurality of remotely located numerically controlled machine tools are controlled by a central processor the improvement comprising means for generating a first signal identifying a machine tool followed by second signals identifying a machine tool part which is altered with use, means at each of said machine tool locations for generating third signals whenever said machine tool part is actually being used, means for transmitting said first, second and third signals to said central processor location, memory means at said central processor storing at different addresses therein fourth signals representative of a desired total time of use for a machine tool part identified by its address and fifth signals indicating the accumulated time of use of said part, address register means for said memory means at said central processor, first delay means at said central processor responsive to said first signal for entering said second signals into said address register, storage register means, presettable counter means, second delay means responsive to the output of said first delay means for enabling the transfer of fourth and fifth signals from the address in said memory means indicated in said address register means respectively into said storage register means and said presettable counter means, means responsive to said third signals for preiodically increasing the count of said presettable counter means, means for continuously comparing the count in said presettable counter means with the fourth signals in said storage register and for producing an output signal when they are identical, means for providing an alarm responsive to said output signals, and means responsive to a succeeding first signal to enable the entry into said memory means of the contents of said storage register and predetermined counter means at the address in said memory means from which said fourth and fifth signals were read out.

References Cited

UNITED STATES PATENTS

| | | | |
|---|---|---|---|
| 2,824,360 | 2/1958 | Giboney | 29—208 |
| 2,946,646 | 7/1960 | Bower et al. | 346—33 |
| 3,079,522 | 2/1963 | McGarrell | 318—162 |
| 3,453,549 | 7/1969 | Payne et al. | 328—72 |

PAUL J. HENON, Primary Examiner

M. E. NUSBAUM, Assistant Examiner

U.S. Cl. X.R.

235—151.11